(12) United States Patent
Roeser et al.

(10) Patent No.: US 10,111,394 B2
(45) Date of Patent: Oct. 30, 2018

(54) PLANT GROWING SYSTEM

(71) Applicant: Garden Fresh Farms LLC, Maplewood, MN (US)

(72) Inventors: David Roeser, Maplewood, MN (US); Bryan Roeser, Maplewood, MN (US)

(73) Assignee: Garden Fresh Farms LLC, Maplewood, MN (US)

( * ) Notice: Subject to any disclaimer, the term of this patent is extended or adjusted under 35 U.S.C. 154(b) by 1200 days.

(21) Appl. No.: 13/717,975

(22) Filed: Dec. 18, 2012

(65) Prior Publication Data

US 2014/0165468 A1    Jun. 19, 2014

(51) Int. Cl.
*A01G 31/02* (2006.01)
*A01G 31/04* (2006.01)
*A01G 13/02* (2006.01)
*A01G 9/12* (2006.01)
*A01G 9/26* (2006.01)

(52) U.S. Cl.
CPC ....... *A01G 31/047* (2013.01); *A01G 13/0237* (2013.01); *A01G 31/02* (2013.01); *A01G 9/12* (2013.01); *A01G 9/26* (2013.01); *Y02A 40/274* (2018.01); *Y02P 60/216* (2015.11)

(58) Field of Classification Search
CPC .............................. A01G 31/02; A01G 31/047
USPC .......................... 47/59 R, 62 R, 62 A, 82, 83
See application file for complete search history.

(56) References Cited

U.S. PATENT DOCUMENTS

| | | | | |
|---|---|---|---|---|
| 3,529,379 A | * | 9/1970 | Ware ................................. | 47/17 |
| 3,882,634 A | * | 5/1975 | Dedolph ........................... | 47/65 |
| 3,973,353 A | * | 8/1976 | Dedolph ........................... | 47/65 |
| 4,765,092 A | * | 8/1988 | Cline ................................ | 47/61 |
| 4,965,962 A | | 10/1990 | Akagi | |
| 5,515,648 A | * | 5/1996 | Sparkes ............................ | 47/65 |
| 6,378,246 B1 | * | 4/2002 | DeFoor ........................ | 47/62 R |
| 6,604,321 B2 | | 8/2003 | Marchildon | |
| 6,840,007 B2 | | 1/2005 | Leduc et al. | |
| 7,181,886 B2 | | 2/2007 | Bourgoin et al. | |

(Continued)

FOREIGN PATENT DOCUMENTS

EP    1 210 868    6/2002

OTHER PUBLICATIONS

International Search Report for International Application No. PCT/US2013/075620, dated Apr. 4, 2014 (4 pages).

(Continued)

*Primary Examiner* — Son T Nguyen
(74) *Attorney, Agent, or Firm* — Hamre, Schumann, Mueller & Larson, P.C.

(57) ABSTRACT

Systems and associated apparatus and methods are described for growing plants in a dense and efficient manner in an indoor environment using artificial light. The systems are configured to hold a high density of plants at a relatively close, substantially fixed distance from a light fixture that provides artificial light for growth of the plants. As the plants grow, the plants are transferred to one or more following stations or stages, each of which is configured to hold the now larger plants at the same relatively close, substantially fixed distance from a light fixture. By providing multiple stages to accommodate plant growth, and maintaining the close positioning of the plants to the light fixtures, the impact of the artificial light on the growth of the plants is maximized and the efficiency of the electrical energy use is increased.

12 Claims, 9 Drawing Sheets

(56) References Cited

U.S. PATENT DOCUMENTS

| | | |
|---|---|---|
| 7,401,437 B2 | 7/2008 | Dumont |
| 7,415,796 B2 | 8/2008 | Brusatore |
| 7,533,493 B2 | 5/2009 | Brusatore |
| 7,559,173 B2* | 7/2009 | Brusatore ........................ 47/82 |
| 7,730,663 B2* | 6/2010 | Souvlos et al. ............... 47/62 C |
| 7,818,917 B2 | 10/2010 | Brusatore |
| 8,104,226 B2 | 1/2012 | Merchildon |
| 2002/0144461 A1 | 10/2002 | Marchildon |
| 2005/0011119 A1 | 1/2005 | Bourgoin et al. |
| 2005/0039396 A1 | 2/2005 | Marchildon |
| 2005/0039397 A1 | 2/2005 | Roy |
| 2006/0196118 A1* | 9/2006 | Brusatore ........................ 47/83 |

OTHER PUBLICATIONS

Written Opinion for International Application No. PCT/US2013/075620, dated Apr. 4, 2014 (9 pages).

Four photos of plant growing systems that were in existence before Dec. 18, 2012, 4 pages.

* cited by examiner

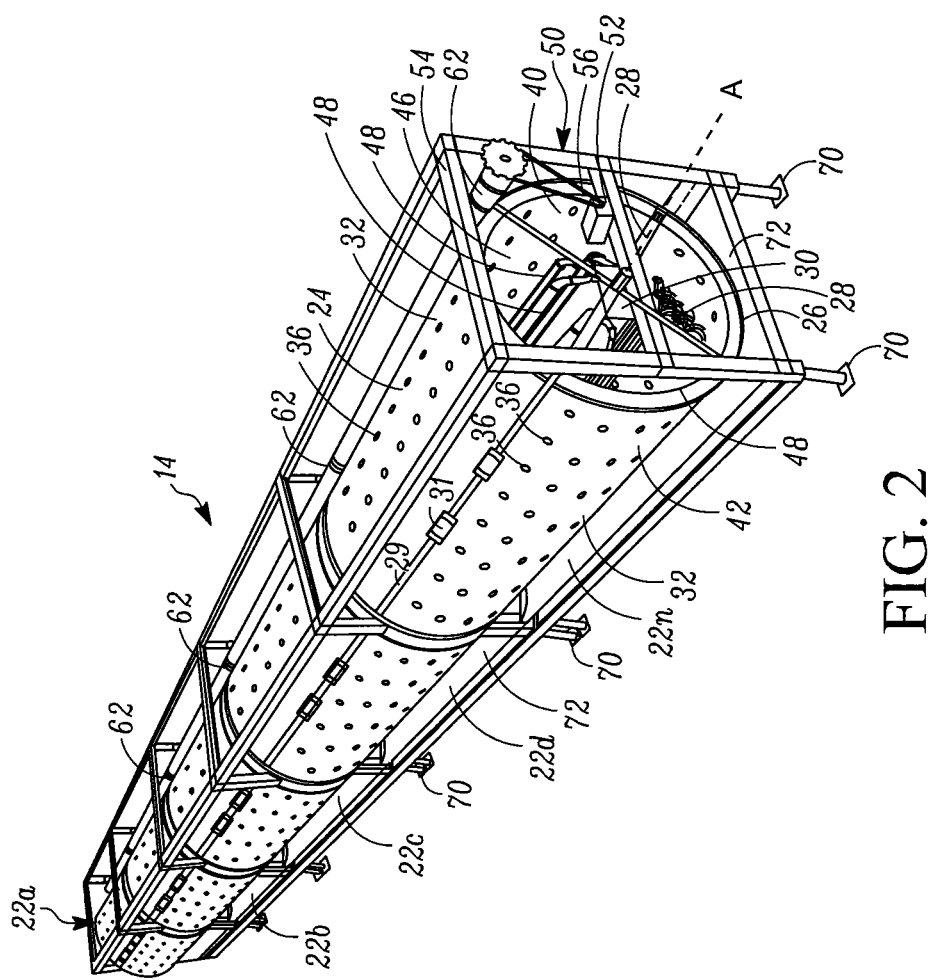

PLANT GROWING SYSTEM

FIELD

This disclosure relates to systems for growing plants in an indoor environment using artificial lights.

BACKGROUND

In traditional agricultural production methods, plants are grown outside and rely on sunlight for growth. However, the plant growth is subject to drought and other adverse weather conditions, as well as exposure to insects. Although special seed and plant varieties, insecticides, and other chemicals can be used to mitigate plant damage, such measures, if available, increase costs, create environmental damage, and are not wanted by many consumers. Traditional agricultural production methods also consume large amounts of fertile land that are not necessarily available across the globe.

Previous efforts have been disclosed at growing plants in indoor environments. See U.S. Pat. Nos. 6,604,321; 6,840,007; 7,181,886; 8,104,226; and 7,818,917.

SUMMARY

Systems and associated apparatus and methods are described for growing plants in a dense and efficient manner in an indoor environment using artificial light. The described systems provide more efficient use of land than traditional agricultural production, and allow for indoor growing of plants year round with less water, higher energy efficiency, reduced waste, and low transportation costs.

The systems are configured to hold a high density of plants at a relatively close, substantially fixed distance from a light fixture that provides artificial light for growth of the plants. As the plants grow, the plants are transferred to one or more following stations or stages, each of which is configured to hold the now larger plants at the same relatively close, substantially fixed distance from a light fixture. By providing multiple stages to accommodate plant growth, and maintaining the close positioning of the plants to the light fixtures, the impact of the artificial light on the growth of the plants is maximized and the efficiency of the electrical energy use is increased.

In one embodiment, a plant growing system is provided that can include first and second plant growing stations that are arranged next to one another in a horizontal direction. Preferably at least two plant growing stations are provided, but there can be any number of stations more than two if desired.

The first and second plant growing stations each include a light fixture and a plant support structure that is configured to hold a plurality of plants thereon with the plants facing the light fixture. The light fixture and the plant support structure are mounted to permit relative movement therebetween. The movement can be, for example, rotary movement or linear movement. In one embodiment, the plant support structure can be a rotatable structure and the light fixture is fixed inside the structure, with the structure rotating about the light fixture. In another embodiment, the plant support structure can be a vertical panel that is mounted for movement in a horizontal direction relative to a vertically arrayed light fixture that is fixed in position adjacent to the vertical panel.

The plant support structure of each of the first and second plant growing stations includes a first surface that in use faces toward its associated light fixture. In the first plant growing station, there is a first substantially constant distance between the light fixture thereof and the first surface of the plant support structure thereof. Likewise, in the second plant growing station, there is a second substantially constant distance between the light fixture thereof and the first surface of the plant support structure thereof. To accommodate plant growth, the first distance is less than the second distance. As the plants grow, the plants can be automatically or manually transferred from the first station to the second station.

Each succeeding plant growing station increases the distance between the surface of the plant growing structure and the light fixture so as to maintain the same relatively close, substantially fixed distance between the plants and the light fixture of each station as the plants grow.

In another embodiment, a plant growing station that is usable in a plant growing system is provided. The station can include a light fixture and a plant support structure that is configured to hold a plurality of plants thereon with the plants facing the light fixture. The light fixture and the plant support structure are mounted to permit relative movement therebetween. The plant support structure includes a first surface that in use faces toward the light fixture with a substantially constant distance therebetween, a second surface opposite the first surface and that is exposed to ambient air, and a plurality of holes formed through the panel from the interior surface to the second surface. In use of the plant growing station, root balls of the plants are held in the holes with the plants facing the light fixture and the root balls of the plants exposed so they can receive air and water. Exposing the root balls to ambient air helps to air prune the roots of the plants so they have less root mass, which reduces plant waste and helps to stress the plants correctly to produce better aroma and flavor.

Nutrient enriched water for the plants can be provided via aquaponics (i.e. the process of raising fish, using fish waste converted with bacteria into nitrogen to fertilize plants hydroponically and returning clean water back to the fish tanks where the cycle repeats itself) or hydroponics where the nutrients are mixed into the water at a suitable point in the process. Water supplied through aquaponic methods have an added benefit of release carbon dioxide that is produced by the aquatic animals, such as fish, directly where the plants are, eliminating the need for a carbon dioxide generator. Nutrients and carbon dioxide are consumed by the plants and the water is returned back to the aquaponic system to repeat the process.

The system described herein can be used to grow many different types of plants. Examples of plants that can be grown include, but are not limited to, leaf lettuce, herbs, water cress, oregano, asian greens, bibb lettuce, oak leaf lettuce, romaine lettuce, thyme, salad mixtures (for example red and green lettuce, etc.), kale, broccoli, basil, spinach, and arugula.

DRAWINGS

FIG. 2 is a perspective view of the rotary plant growing system looking from the end containing the final station.

DETAILED DESCRIPTION

Figure 1A:
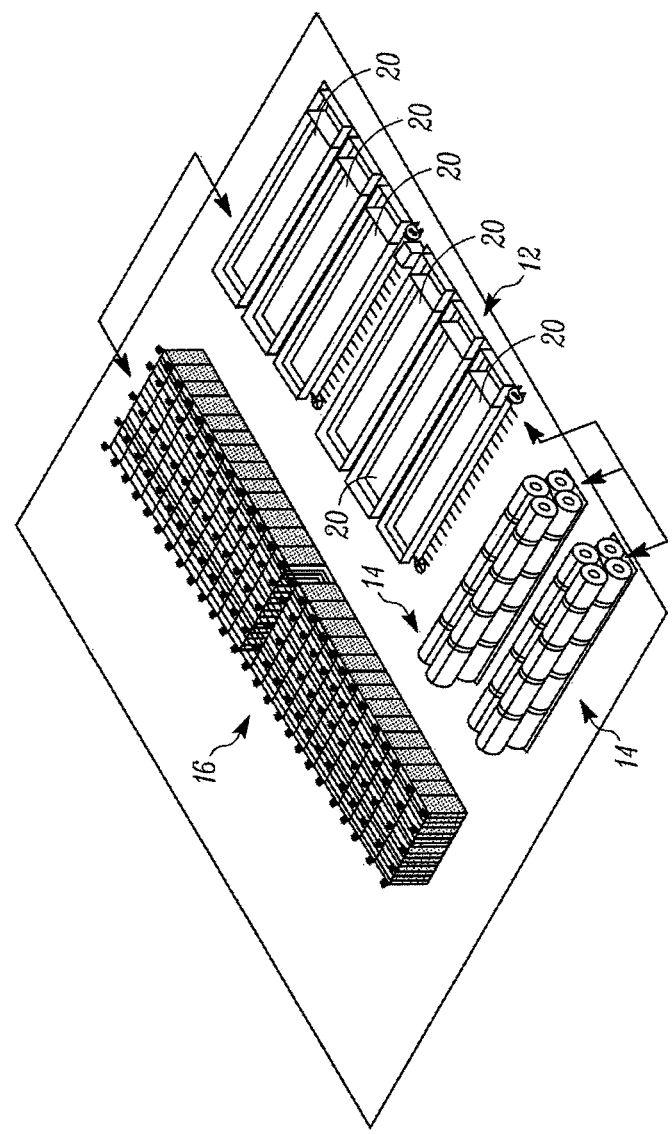
FIG. 1a illustrates a plant growing system described herein including multi-station rotary and vertical plant growing systems, and an aquaponic system.

With reference initially to FIG. 1a, an exemplary plant growing system 10 described herein is illustrated. The system 10 can include a water supply 12, one or more rotary plant growing systems 14, and/or one or more vertical plant growing systems 16. The plant growing systems 14, 16 can be used separately or together in combination. Each plant growing system 14, 16 is fluidly connected to the water supply 12 which supplies water to the respective system. In the illustrated example, the water supplied by the water supply 12 is nutrient enriched water to facilitate plant growth in the systems 14, 16. Unused water from the systems 14, 16 can be returned back to the water supply 12.

In use, either or both of the plant growing systems 14, 16 can be disposed within an enclosed building, such as a warehouse. Typically, the building will be enclosed such that plants on each system 14, 16 will not be (or will at least minimally be) exposed to direct sunlight. Therefore, light for growth of the plants will primarily or entirely be provided by artificial lighting sources and/or redirected solar energy sources that are exposed to each system 14, 16. If both systems 14, 16 are used, the systems can be located in the same room of the building or in separate rooms.

The water supply 12 can be located in the same building as the systems 14, 16, such as in the same room(s) or in a room separate from the systems 14, 16. Alternatively, the water supply 12 can be located outside the building containing the systems 14, 16, such as in a different building or in the open environment.

Figure 1B:
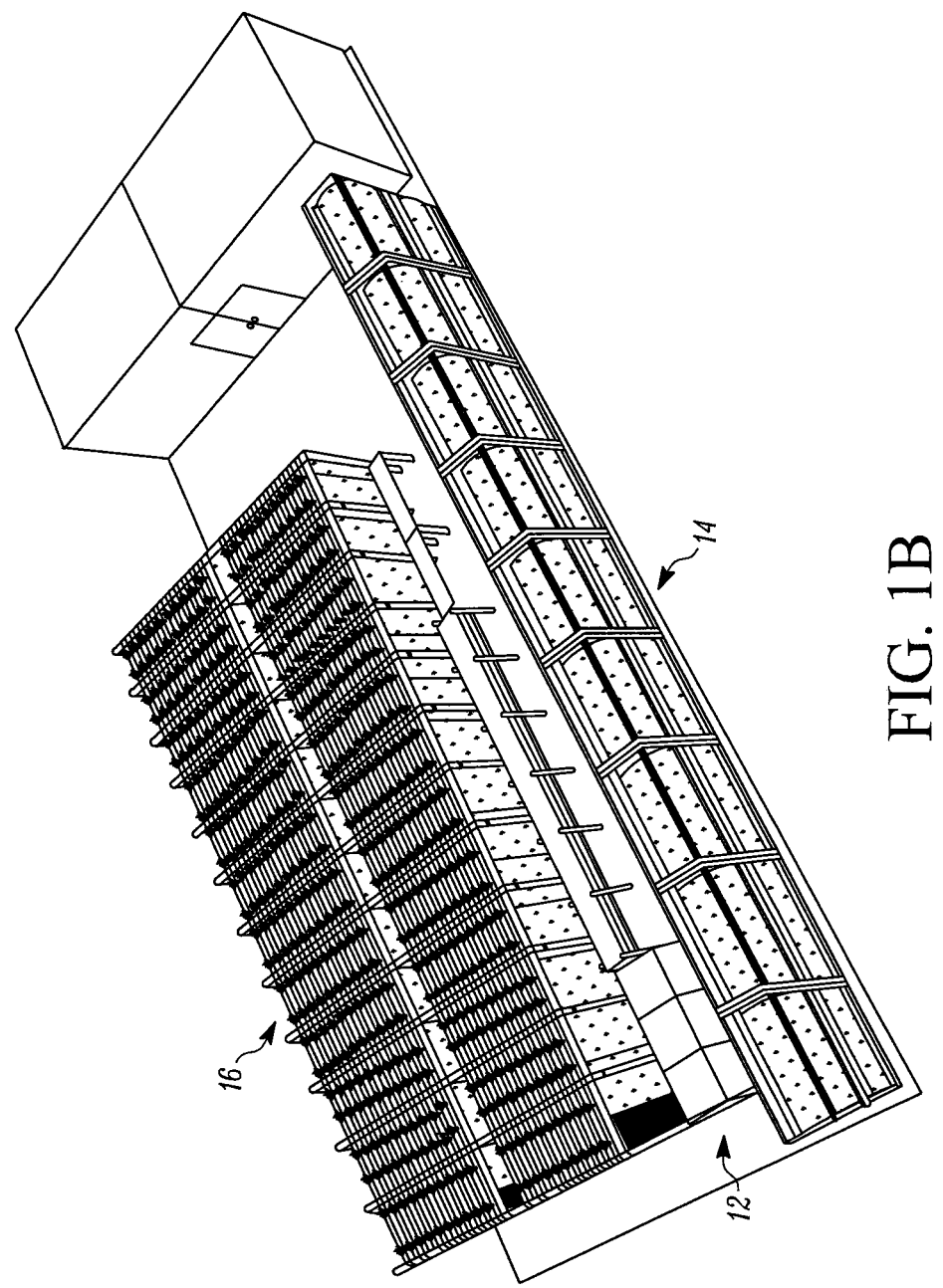
FIG. 1b illustrates a plant growing system described herein including multi-station rotary and vertical plant growing systems, and a hydroponic system.

In the illustrated example of FIG. 1a, the water supply 12 is illustrated as being formed by an aquaponic system although a hydroponic system illustrated in FIG. 1b can be used together with or separate from the aquaponic system. In the aquaponic system, fish are raised in one or more tanks 20. Nutrient enriched water for the plants is created using fish waste that is converted with bacteria into nitrogen to fertilize the plants hydroponically. Nutrients and carbon dioxide are consumed by the plants and the water is returned back to the aquaponic system to repeat the process. The construction and operation of aquaponic systems for generating nutrient enriched water are known in the art. The fish raised in the tanks 20 can also serve as a food source.

Rotary Plant Growing System

Figure 3:
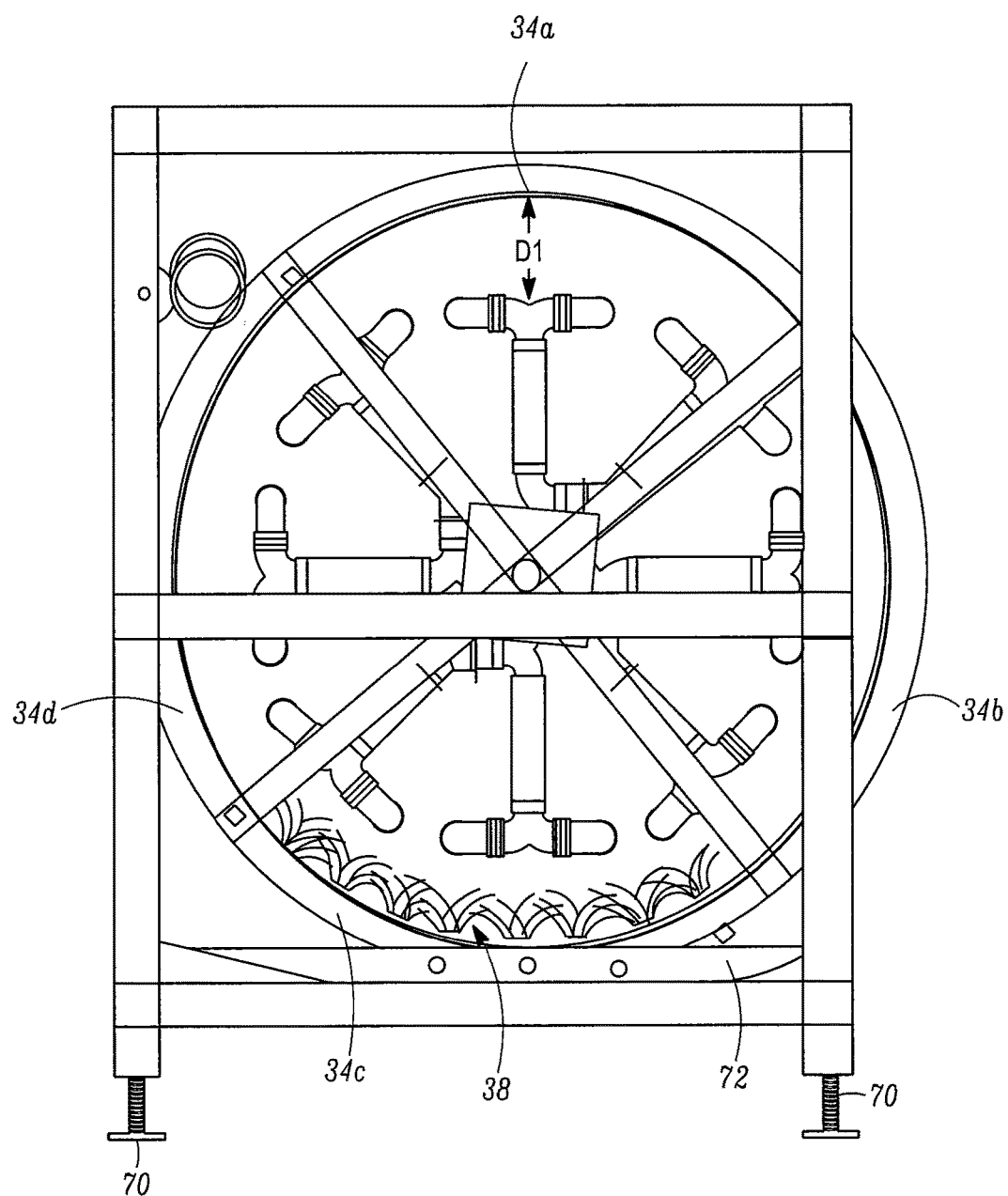
FIG. 3 is an end view of the rotary plant growing system looking from the end containing the initial station.
Figure 4:
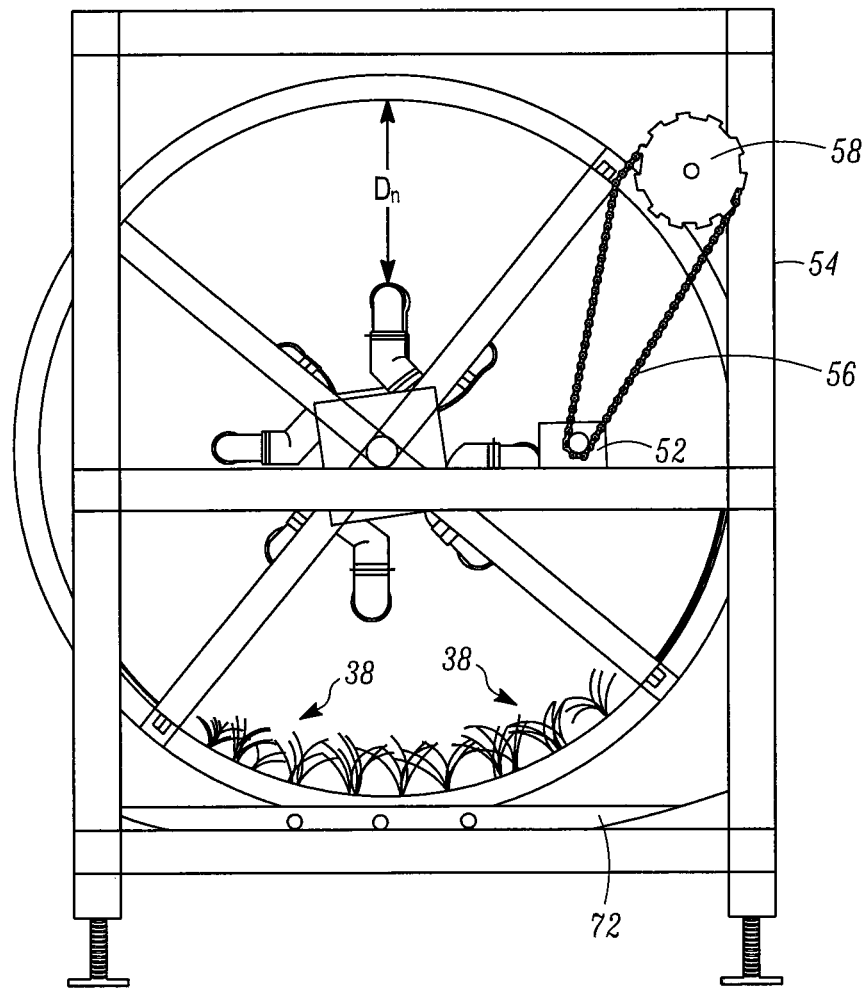
FIG. 4 is an end view of the rotary plant growing system looking from the end containing the final station.

With reference now to FIGS. 2-4, an exemplary embodiment of the rotary plant growing system 14 is illustrated. FIG. 1a shows four of the systems 14 grouped together to form two separate rotary plant growing units, with each unit having two systems on a lower level and two systems on an upper level. However, any number of units having any number of individual systems 14 can be deployed.

As best seen in FIG. 2, the system 14 includes a plurality of plant growing stations 22a, 22b, . . . n arranged next to one another in a horizontal direction. It is preferred, but not required, that the system 14 include at least two plant growing stations. In the illustrated example, there are five plant growing stations, but a larger or smaller number of plant growing stations can be used. In addition, instead of arranging the stations horizontally, the stations can be arranged next to one another in a vertical direction.

The plant growing stations are arranged side-by-side adjacent to one another, with the station 22a being an initial or first stage station, which is followed by the station 22b, which in turn is followed by the station 22c, which in turn is followed by the station 22d, and finally by the final station 22n. The initial station 22a is configured to receive plants to be grown where the plants are germinated to have an initial size and have roots to hold the growing media together. However, in appropriate circumstances, seeds could be used. As the plants progress through the stations 22a, b, . . . n, the plants increase in size and at the final station 22n, the plants reach a size suitable for harvesting the plants. It should be apparent that the number of plant growing stations used will depend on factors such as the growth rate of the plants, the type of plants being grown, and the amount of light, among others.

Each plant growing station 22a, b, . . . n comprises a structure 24 that is rotatable about a central axis A-A. The structure 24 can have any shape that one finds suitable for growing plants as described herein. In the illustrated example, each structure 24 can be generally cylindrical, although other shapes can be used. Each structure comprises a circular frame 26 at each end of the structure 24 with radial spokes 28 that connect the frame 26 to a central hub 30. A plurality of, for example four, longitudinal support beams 29 extend in a longitudinal direction parallel to the axis A-A between the frames 26 at each end.

Plant support structures 32, in this example four curved quarter panels 34a, b, c, d, are removably attached to one another and are supported at their ends by the frames 26 and along their top and bottom edges by the beams 29. The beams 29 include brackets 31 (two of which are visible in FIG. 2) that are configured to releasably clamp the panels 34a-d to the frames 26 and the beams 29.

Each of the quarter panels 34a-d is configured to hold a plurality of plants thereon with the plants facing radially inward toward the axis A-A. As best seen in FIGS. 2-4, each panel 34a-d is formed with a plurality of holes 36 in which root balls of plants 38 can be held. The holes 36 extend through the panels 34a-d from a first, inwardly facing surface 40 that in use faces inwardly toward the axis A-A to a second, outwardly facing surface 42 that faces outwardly.

Each of the plant growing stations 22a, b, . . . n further includes a light fixture 46 associated therewith that provides the light for plant growth. The light fixtures 46 are disposed inside of the respective structures 24 and the light fixtures 46 extend a length of the structures 24 sufficient to provide light to the plants for plant growth. In the illustrated example, the light fixtures 46 extend substantially the entire axial length of the associated structure 24, although other constructions can be used as long as adequate light for growth is provided.

The light fixtures 46 are fixed in position within the structures such that the structures 24 rotate about the light fixtures. However, the light fixtures 46 can be rotatable and the structures 24 fixed such that the light fixtures rotate relative to the structures 24. In any event, the light fixtures and the structures are mounted to permit relative movement, in this case rotational movement, therebetween. Relative rotation ensures that all the plants on the structures and facing inward toward the light fixtures are exposed to a sufficient amount of light energy for plant growth.

In the illustrated example, each of the light fixtures 46 comprises a plurality of elongated fluorescent bulbs 48 that extend substantially the length of the respective structure and which are evenly radially spaced from the axis A-A and are equally circumferentially distributed from one another about the axis A-A. Other suitable light energy sources can be used. As discussed below, the number of bulbs 48 in each of the light fixtures 46 varies from station to station, with the number of bulbs generally decreasing from the first station 22a to the final station 22n. With reference to FIGS. 3-4, in each of the stations 22a, b, . . . n, the distance D between the inwardly facing surface 40 of the structure and the respective light fixture 46 of that station is substantially constant. However, the distance D increases in each station starting from the station 22a, with the distance D1 (FIG. 3) in the station 22a being the smallest and the distance Dn (FIG. 4) in the station 22n being the largest. Between the station 22a and the station 22n, the distance D of the respective stations increases. The increase in the distance D in each station accommodates the growth in the plants in each station so that the distance between the canopies of the plants being grown and the light fixture 46 remains generally constant in each station. The distance D and the spacing of the plant canopy from the light fixture can vary based on the type of plant species being grown.

In one embodiment, the plants are exposed to generally the same amount of light in each station. As the distance D increases (i.e. the diameter of the light fixture 46 decreases) and the plant canopy gets larger, the number of the bulbs 48 used in the light fixture 46 in each station can change so that the plants are exposed to generally the same amount of light in each station. For example, the station 22a can include, for example, sixteen bulbs 48, while the station 22n can include, for example, eight bulbs 48. However, other techniques can be used to expose the plants to generally the same amount of light in each station, such as using different types and/or sizes of bulbs in the stations, controlling how long the bulbs are on in each station, and the like. In one embodiment, the light fixtures 46 are controlled by a timer that is adjustable so that the plants are exposed to the appropriate daily light integral for the particular plant species.

Returning to the structure 24, the panels 34a-d are detachably connected to one another and to the structure using the brackets 31. As the plants 38 grow they are transferred from one station to the next station by removing each panel, and installing it on the next station after the panels of the next station have been removed and transferred to its following station. If the station is the last station, the panels are removed for harvesting the plants.

Instead of removing the panels and transferring to a new station, in one embodiment it is possible to change the diameter of the light fixture in a station and keep the panels fixed in that station until the plants are ready for harvest. In this embodiment, multiple stations or a single station could be used, since the panels would remain in place and the diameter of the light fixture changed. The light fixture diameter could be changed by changing the diameter of the installed light fixture as the plants grow, or by removing the light fixture and replacing it with a new light fixture having a different diameter.

With reference to FIGS. 2 and 4, the structures 24 are rotated via a suitable drive mechanism(s) 50. Any drive mechanism(s) 50 that is capable of rotating the structures 24 can be used. In the illustrated example, the drive mechanism 50 includes an electric motor 52 mounted on a support frame structure 54 of the stations. The electric motor 52 has an output shaft fixed to a drive pinion that drives a drive chain 56 that extends around a drive gear 58 that is fixed to a shaft 60 that extends the length of the system 14. Along its length, the shaft 60 includes drive sections 62 that are engaged with the periphery of one of the circular frames 26 to rotate the frames 26 and thus rotate the structures 24.

It is preferred that the structures 24 are rotated by the drive mechanism 50 at a constant speed. The particular speed can depend on a number of factors, including the specie of plant being grown, the amount of light provided by the light fixtures, and other factors. In one example, the rotation speed can be 1 revolution every 35 minutes. The inventor has found that this speed results in proper air root pruning of the root balls of the plants which are exposed to atmosphere on the exterior of the structures 24 so that the plants have less root mass, reducing waste and stressing the plants correctly to produce better aroma and flavor. In general, the slower the rotation, the more root pruning that occurs. In another example, the rotation speed can be between 1 revolution every 30 to 45 minutes. In a hot dry climate, a faster rotation speed may be appropriate to prevent the roots from drying out.

In the illustrated example, each station is rotated at the same speed. However, in another embodiment, the stations are separately driven and rotated at different rotation speeds.

The support frame structure 54 is a rectangular structure that can be stackable and/or arranged side-by-side and bolted together as shown in FIG. 1. The structure 54 also has adjustable feet 70 along its length to allow for height and slope adjustment of the system 14.

As shown in FIGS. 2-4, each station also includes a water feed trough 72 into which nutrient rich water from the water supply 12 is fed. The bottom of each structure 24 is disposed in the trough so that the root balls of the plants are dipped into the water in the troughs 72 as the structures are rotated. The troughs 72 of each station can form one continuous trough, or the troughs can be separate from one another but fluidly connected so that nutrient rich water flow from one trough to another. The troughs 72 are sloped downwardly from the final station 22n to the first station 22a, so that nutrient rich water from the water supply 12 is initially fed into the trough of station 22n where plants are larger and require more water, the water then flowing through each successive trough of the remaining stations until flowing into a collection basin for return to the water supply 12 after flowing through the station 22a.

In one exemplary use of the system 14, plants to be grown are transplanted into the holes 36 in the panels 34a-d. The panels are then mounted to the structure 24 of the first station 22a. The remaining stations 22b, c, . . . n are either empty or have panels containing larger plants that started out at the first station 22a.

The structures 24 and the light fixtures are then rotated relative to one another about the axis A-A at a constant rate. As the structures rotate, they dip the root ball ends of the plants into the troughs 72 to feed moisture to the plants. At the end of the determined growing time interval, the rotation is stopped, and the panels are shifted forwardly one station by removing the panels and mounting them on the next station. The panels from the final station 22n are removed and the plants thereon harvested. This process is repeated until the panels initially on the first station 22a have been installed on the final station and rotated the desired time interval to achieve the desired harvest height. Panels from which plants have been harvested are cleaned and new plant transplants are inserted into the holes so that the panels can be reinstalled on the first station. The time interval is a function of plant growth. If the nutrients are correct and there is the right light and light time, plants grow faster. If humid, plants take in less and grow slower, so the interval varies based on the environment, the plant species, plant health and other plant factors.

Vertical Plant Growing System

Figure 5:
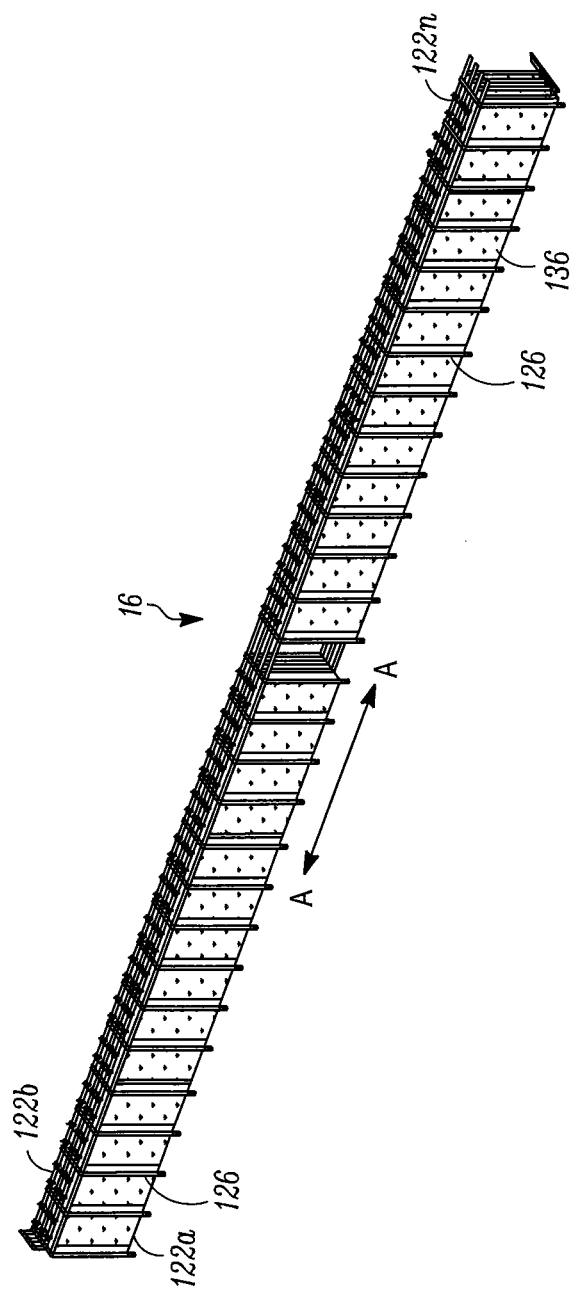
FIG. 5 is an elevated side perspective view of the vertical plant growing system.

With reference now to FIGS. 5-8, an exemplary embodiment of the vertical plant growing system 16 will now be described. As best seen in FIG. 5, the system 16 includes a plurality of plant growing stations 122a, 122b, . . . n arranged next to one another in a horizontal direction. It is preferred, but not required, that the system 16 include at least two of the plant growing stations. In the illustrated example, there are twenty eight of the plant growing stations, but a larger or smaller number of plant growing stations can be used.

The plant growing stations are arranged side-by-side adjacent to one another, with the station 122a being an initial or first stage station, which is followed by the station 122b, which in turn is followed by additional stations including the final station 122n. The initial station 122a is configured to receive plants to be grown where the plants are germinated to have an initial size and have roots to hold the growing media together. However, in appropriate circumstances, seeds could be used. As the plants progress through the stations 122a, b, . . . n, the plants increase in size and at the final station 122n, the plants reach a size suitable for harvesting the plants. It should be apparent that the number of plant growing stations used will depend on factors such as the growth rate of the plants, the type of plants being grown, and the amount of light, among other factors.

Each plant growing station 122a, b, . . . n comprises a stationary support frame 124 that extends along a longitudinal direction A-A. The support frame 124 includes a plurality of vertical support poles 126, a plurality of lower horizontal supports 128, and a plurality of upper horizontal supports 130 along the length of the frame 124. Plant support structures 132, in this case a plurality of movable vertical panels 134a, b, c, d, are suspended in a vertical orientation from their top ends in a manner described further below.

Figure 7:
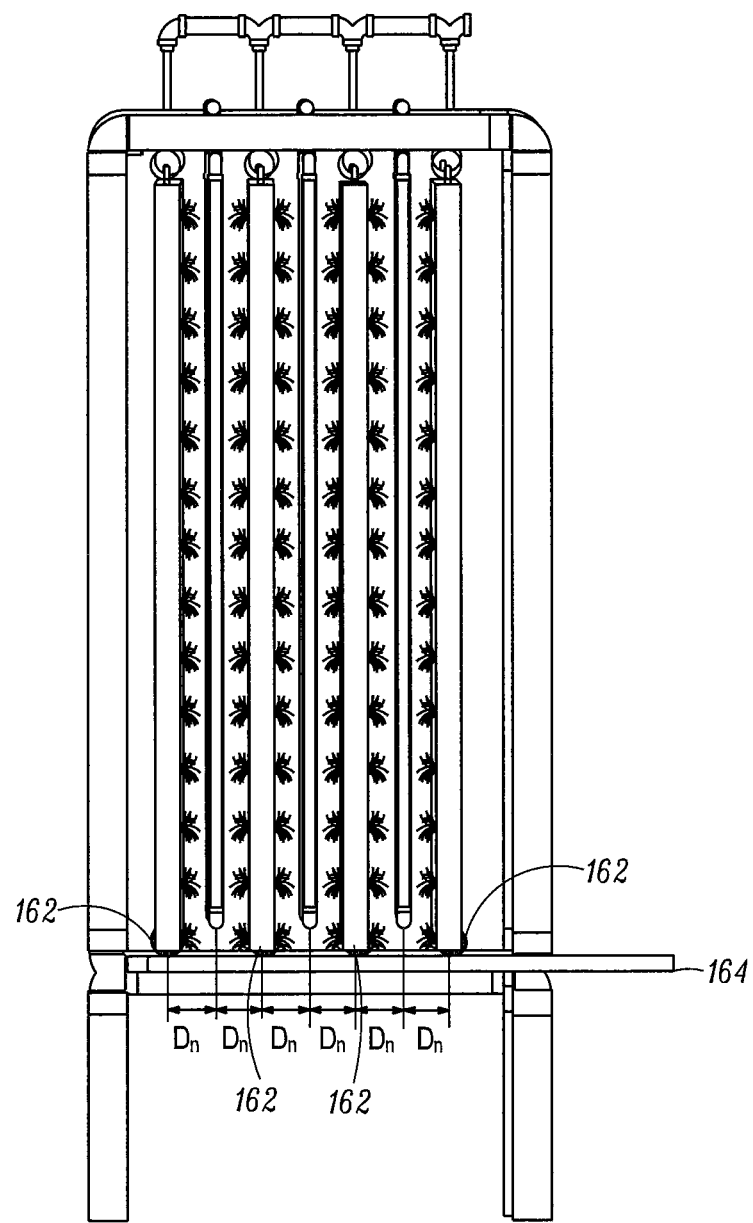
FIG. 7 is an end view of the vertical plant growing system looking from the end containing the last station.
Figure 8:
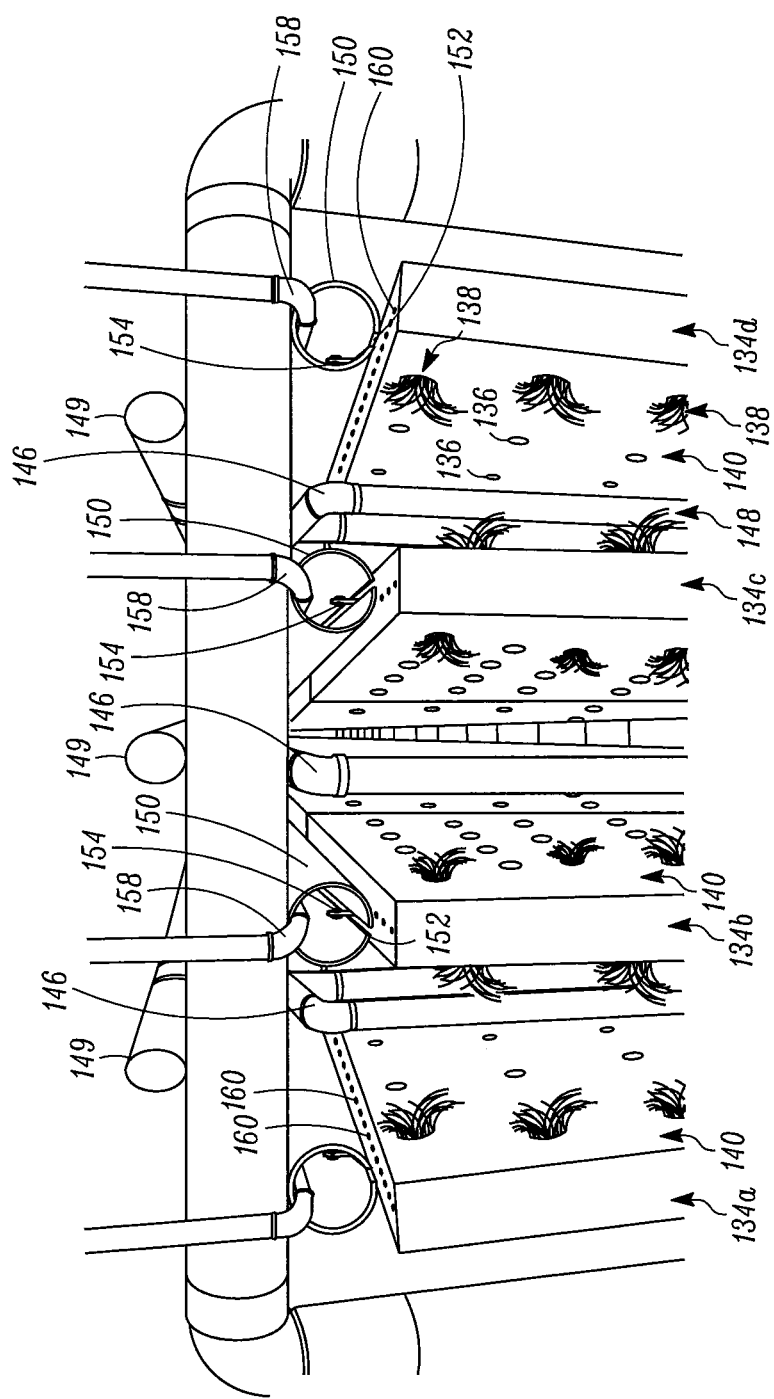
FIG. 8 is a close-up view of a top portion of the initial station.

Each of the panels 134a-d is configured to hold a plurality of plants thereon with the plants facing toward a light fixture described further below. As best seen in FIGS. 7-8, each panel 134a-d is formed with a plurality of holes 136 in which root balls of plants 138 can be held. The holes 136 are formed in what can be termed inwardly facing surfaces 140 of the panels that in use face inwardly toward the light fixture. The surfaces 140 are inwardly facing in that they face inwardly toward the light fixtures.

In the illustrated example, the panels 134a-d are double-sided panels in that the panels 134a-d have holes 136 formed on each of its sides. However, the panels 134a, 134d have plants 138 mounted on only one side thereof facing the light fixtures, while the panels 134b, 134c have plants 138 mounted on each side thereof. It is to be realized that the panels 134a-d need not have holes 136 on each of their sides. In addition, the hole spacing can vary based on the species of plant being grown.

Each of the plant growing stations 122a, b, . . . n further includes one or more light fixtures 146 associated therewith that provides the light for plant growth. In the illustrated example, three separate light fixtures 146 are provided, one light fixture 146 between the panels 134a, 134b, a second light fixture 146 between the panels 134b, 134c, and a third light fixture 146 between the panels 134c, 134d. The light fixtures 146 are identical in construction to each other.

In the illustrated example, each of the light fixtures 146 comprises a plurality of vertically arranged elongated fluorescent light bulbs 148, where each bulb extends substantially the entire vertical height of the panels 134a-d. In addition, for each of the light fixtures 146, the individual bulbs 148 are evenly spaced from one another in the longitudinal direction A-A. The number of bulbs 148 in each of the light fixtures 146 can be the same in each station. The light fixtures 146 are supported from longitudinal supports 149 that extend in the A-A direction.

Figure 6:
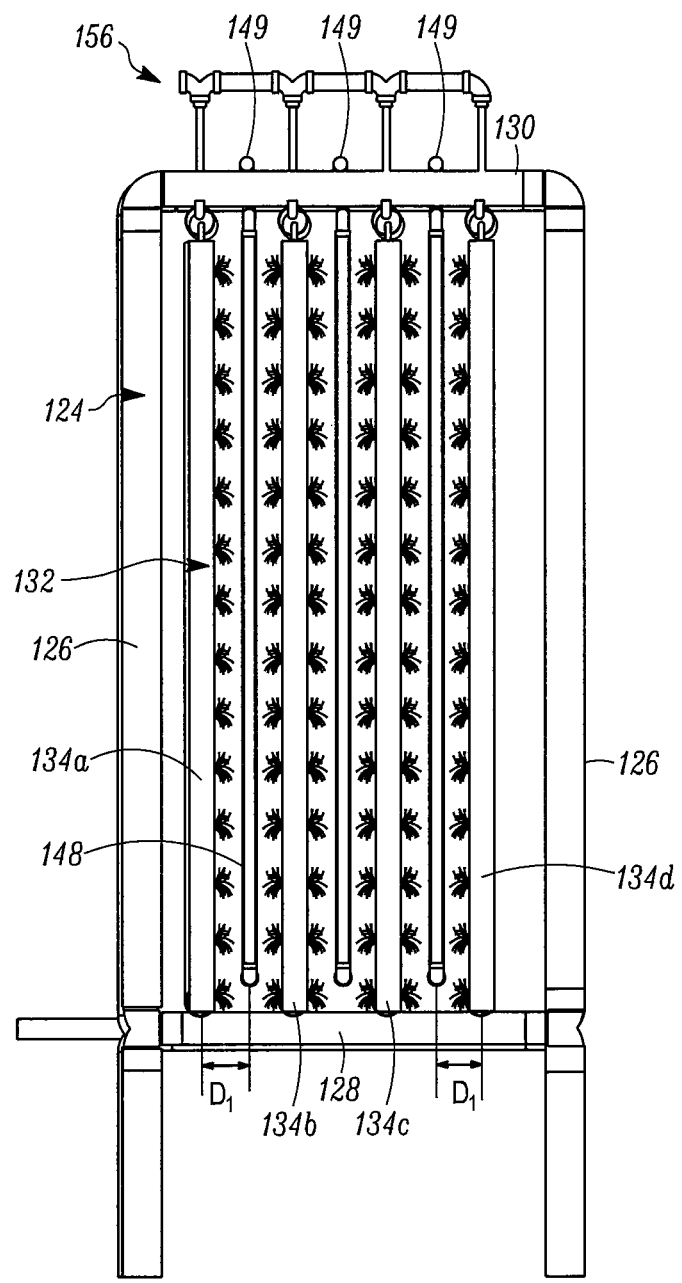
FIG. 6 is an end view of the vertical plant growing system looking from the end containing the initial station.

With reference to FIGS. 6-7, in each of the stations 122a, b, . . . n, the distance D between the inwardly facing surface 140 of the panel and the respective light fixture 146 of that station is substantially constant. However, the distance D increases in each station starting from the station 122a, with the distance D1 (FIG. 6) in the station 122a being the smallest and the distance Dn (FIG. 7) in the station 122n being the largest. Between the station 122a and the station 122n, the distance D of the respective stations increases. The increase in the distance D in each station accommodates the growth in the plants in each station so that the distance between the canopy of the plants being grown and the light fixtures 146 remains generally constant in each station. The specific distance D and the spacing of the plant canopy from the light fixture can vary based on the type of plant species being grown.

In one embodiment, the number of bulbs in each station is the same and the plants are exposed to generally the same amount of light in each station. However, other techniques can be used to expose the plants to generally the same amount of light in each station, such as using different types and/or sizes of bulbs in the stations, controlling how long the bulbs are on in each station, and the like. In one embodiment, the light fixtures 146 are controlled by a timer that is adjustable so that the plants are exposed to the appropriate daily light integral for the particular plant species.

The panels 134a-d and the light fixtures 146 are mounted so that they are movable relative to each other in the direction A-A from the station 122a to the station 122n. In particular, the panels 134a-d are mounted so as to be movable relative to the light fixtures 146 in the direction A-A.

With reference to FIG. 8, the panels 134a-d are movably suspended on longitudinal supports 150 that extend in the A-A direction. In the illustrated example, the supports 150 are generally hollow, and have a slot 152 running the length thereof. The top end of each panel 134a-d includes a plurality of roller assemblies 154 formed by a pair of wheels rotatably mounted on pins that extend upwardly through the slot 152. The roller assemblies 154 allow the panels 134a-d to slide relative to the supports 150 so that the panels can be moved from station to station in the direction A-A from the station 122a ultimately to the station 122n. In one embodiment, the panels are pushed manually from station to station, but an automated transport mechanism, such as one similar to a dry cleaners storage rack, could be utilized.

It is preferred that the panels reside at each station a predetermined time depending upon the plants being grown. For example, in one embodiment, the panels are moved to the next station every day. At the end of the predetermined time period, the panels are moved to the next station. With respect to the last station 122n, the plants are ready for harvest at the end of the predetermined time so the panels are removed and the plants harvested therefrom.

An irrigation system is provided for feeding nutrient rich water to the plants 138. In particular, with reference to FIG. 6, a water feed line 156 is fluidly connected to the water supply 12 to receive nutrient rich water therefrom. The water feed line 156 feeds the water to water lines 158 that are disposed within and run the length of the supports 150 (FIG.

8). The water lines 158 include openings or other means of discharging the water within the supports 150. The discharged water flows through the slots 152 in the supports 150 and falls onto the top ends of the panels 134a-d where a collector system resides to distribute water evenly throughout the panel (FIG. 8). The panels 134a-d are generally hollow structures with water channels inside and with openings 160 at the top through which the water can flow into the interior of the panels. The water passes through the panels 134a-d, wetting the root balls of the plants 138. The water then exits the bottom of the panels through suitable openings and falls into gutters 162 disposed beneath each of the panels 134a-d (FIG. 7). The gutters 162 run the length of the system 16 and discharge into a collector 164 (FIG. 7) for return to the water supply 12. The gutters 162 are sloped downwardly from the first station 122a to the final station 122n so that the water flows via gravity to the collector 164.

The irrigation system can be divided into zones depending upon the water pressure needed for each station. In one embodiment, each zone has a specific time to distribute water through that section based on the physical needs of the plants in the specific zone. At the end of the specific time, the water to that zone is shut-off and water started to the next zone. In addition, suitable manual or electro-mechanical valves can be provided for controlling the water flow, which is pumped by a pump from the water supply 12. An irrigation controller can be provided which controls when water is provided. The controller can start the pump and open the valves to allow water to flow, and shut off the pump and/or close the valves when sufficient water has been provided. In another embodiment, water can be provided at the same time to each zone.

In one exemplary use of the system 16, plants to be grown are transplanted into the holes 136 in the panels 134a-d. The panels are then mounted to the supports 150 o the first station 122a. The remaining stations 122b, c, . . . n are either empty or have panels containing larger plants that started out at the first station 122a.

The growing time interval for each station can be the same or different. Also, the rows of panels can move at the same time interval, or certain rows can move faster or slower than the other rows, depending on the growth of a specific plant species in each station or row. For example, oregano grows slower, and asian greens grow faster.

During a predetermined growing period, the plants are exposed to light from the light fixtures 146 and watered by the irrigation system. Once the growing period is completed, the panels are moved to the next station by rolling the panels along the supports 150 using the roller assemblies 154. The panels from the final station 122n are removed and the plants thereon harvested. This process is repeated until the panels initially at the first station 122a have reached the final station and have achieved the desired harvest height. Panels from which plants have been harvested are cleaned and new plant transplants are inserted into the holes so that the panels can be reinstalled on the first station.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A plant growing system, comprising:
   first and second plant growing stations that are arranged next to one another;
   the first and second plant growing stations each include a light fixture and a plant support structure that is configured to hold a plurality of plants thereon with the plants facing the light fixture, the light fixture and the plant support structure are mounted to permit relative movement therebetween;
   the plant support structure of each of the first and second plant growing stations includes a first surface that in use faces toward its associated light fixture;
   in the first plant growing station, there is a first substantially constant distance between the light fixture thereof and the first surface of the plant support structure thereof;
   in the second plant growing station, there is a second substantially constant distance between the light fixture thereof and the first surface of the plant support structure thereof;
   the first distance is less than the second distance;
   the first and second plant growing stations are rotary plant growing stations, the plant support structure of each plant growing station comprises a rotatable structure that is rotatable about an axis of the structure and that surrounds the light fixture which is fixed in position; and
   the rotatable structure of the first plant growing station has a diameter that is substantially equal to the diameter of the rotatable structure of the second plant growing station.

2. The plant growing system of claim 1, further comprising a third plant growing station, wherein the first plant growing station is followed by the second plant growing station, and the second plant growing station is followed by the third plant growing station;
   the third plant growing station includes a light fixture and a plant support structure that is configured to hold a plurality of plants with the plants facing the light fixture thereof, the light fixture of the third plant growing station and the plant support structure of the third plant growing station are mounted to permit relative movement therebetween;
   the plant support structure of the third plant growing station includes a first surface that in use faces toward the light fixture thereof;
   in the third plant growing station, there is a third distance between the light fixture thereof and the first surface of the plant support structure thereof; and
   the third distance is greater than the second distance.

3. The plant growing system of claim 1, wherein each plant support structure comprises a panel with the first surface facing the light fixture of the respective plant growing station, a second surface opposite the first surface and that is exposed to air, and a plurality of holes formed through the panel from the first surface to the second surface, wherein in use, root balls of the plants are held in the holes with the plants facing the light fixture and the root balls of the plants exposed to air.

4. The plant growing system of claim 1, wherein the rotatable structure comprises a plurality of panels that are removably attached to one another, and each of the panels is formed with a plurality of holes in which root balls of the plants can be held.

5. The plant growing system of claim 1, wherein the rotatable structure is rotatable about the axis of the structure relative to the light fixture at a constant speed.

6. The plant growing system of claim 1, further comprising a water trough underneath the rotatable structure of each plant growing station, the water troughs are fluidly connected to one another, and the water trough associated with the second plant growing station is disposed at a higher elevation than the water trough associated with the first plant growing station.

7. The plant growing system of claim 6, further comprising an aquaponic or hydroponic system fluidly connected to the water troughs, the aquaponic or hydroponic system is configured to supply nutrient rich water.

8. The plant growing system of claim 1, wherein the axis of the first plant growing station is collinear to the axis of the second plant growing station.

9. The plant growing system of claim 1, wherein each light fixture comprises a plurality of bulbs, and the number of bulbs in the light fixture of the first plant growing station is greater than the number of bulbs in the light fixture of the second plant growing station.

10. A plant growing system, comprising:
    first and second plant growing stations that are arranged next to one another;
    the first and second plant growing stations each include a light fixture and a plurality of panels, each panel is configured to hold a plurality of plants thereon with the plants facing the light fixture, the light fixture and the panels are mounted to permit relative movement therebetween;
    a plurality of plants mounted on each panel of each of the first and second plant growing stations;
    in the first plant growing station, a first substantially constant distance between the light fixture thereof and the plants mounted on the panels thereof;
    in the second plant growing station, a second substantially constant distance between the light fixture thereof and the plants mounted on the panels thereof;
    the first substantially constant distance is equal to the second substantially constant distance;
    the first and second plant growing stations are rotary plant growing stations, the plant support structure of each plant growing station comprises a rotatable structure that is rotatable about an axis of the structure and that surrounds the light fixture which is fixed in position; and
    the rotatable structure of the first plant growing station has a diameter that is substantially equal to the diameter of the rotatable structure of the second plant growing station.

11. The plant growing system of claim 10, wherein each panel has a first surface facing the light fixture of the respective plant growing station, a second surface opposite the first surface and that is exposed to air, and a plurality of holes formed through each panel from the first surface to the second surface, wherein in use, root balls of the plants are held in the holes with the plants facing the light fixture and the root balls of the plants exposed to air.

12. The plant growing system of claim 10, wherein each light fixture comprises a plurality of bulbs, and the number of bulbs in the light fixture of the first plant growing station is greater than the number of bulbs in the light fixture of the second plant growing station.

\* \* \* \* \*